(12) United States Patent
Fu (10) Patent No.: US 9,586,119 B2
(45) Date of Patent: Mar. 7, 2017

(54) MULTI-TRAINING FUNCTION AIR-WATER PUNCHING BAG STRUCTURE

(71) Applicant: Tung-Chien Fu, New Taipei (TW)

(72) Inventor: Tung-Chien Fu, New Taipei (TW)

( * ) Notice: Subject to any disclaimer, the term of this patent is extended or adjusted under 35 U.S.C. 154(b) by 36 days.

(21) Appl. No.: 14/668,929

(22) Filed: Mar. 25, 2015

(65) Prior Publication Data
US 2015/0273306 A1   Oct. 1, 2015

(30) Foreign Application Priority Data

Mar. 31, 2014 (TW) .............................. 103205485 U (51) Int. Cl.
| | |
|---|---|
| A63B 21/00 | (2006.01) |
| A63B 21/06 | (2006.01) |
| A63B 21/072 | (2006.01) |
| A63B 23/12 | (2006.01) |
| A63B 69/00 | (2006.01) |
| A63B 69/20 | (2006.01) |
| A63B 69/34 | (2006.01) |
| A63B 71/00 | (2006.01) |

(52) U.S. Cl.
CPC ........ *A63B 69/201* (2013.01); *A63B 21/0602* (2013.01); *A63B 21/072* (2013.01); *A63B 21/4035* (2015.10); *A63B 23/12* (2013.01); *A63B 69/345* (2013.01); *A63B 21/00069* (2013.01); *A63B 23/1236* (2013.01); *A63B 69/004* (2013.01); *A63B 2071/0063* (2013.01); *A63B 2244/104* (2013.01); *A63B 2244/108* (2013.01)

(58) Field of Classification Search
CPC ........................................ A63B 69/30–69/325
See application file for complete search history.

(56) References Cited

U.S. PATENT DOCUMENTS

| | | | | |
|---|---|---|---|---|
| 4,103,889 | A * | 8/1978 | Lobur | A63B 69/201 273/DIG. 20 |
| 9,199,151 | B2 * | 12/2015 | Fu | A63B 69/20 |
| 2002/0086776 | A1 * | 7/2002 | Fields | A63B 69/201 482/83 |
| 2002/0115538 | A1 * | 8/2002 | Wen | A63B 69/34 482/83 |
| 2012/0246884 | A1 * | 10/2012 | Wilson | A63B 69/004 24/302 |
| 2014/0226919 | A1 * | 8/2014 | Fu | A63B 69/20 383/3 |

* cited by examiner

*Primary Examiner* — Loan H Thanh
*Assistant Examiner* — Jennifer M Deichl
(74) *Attorney, Agent, or Firm* — Raymond Y. Chan; David and Raymond Patent Firm (57) ABSTRACT

The present invention discloses a multi-training function air-water punching bag structure that comprises one inner bladder, one external bag, at least one set of handles, at least two sets of first suspenders, and at least one set of second suspenders. The inner bladder respectively contains liquid and air simultaneously. Users can adjust the volume of the liquid and air according to the needs of training and the tactile feel of the punches. The external bag integrates the handle set or the first set of suspenders and the second set of suspenders to reach the effect of multi-training functions.

11 Claims, 9 Drawing Sheets

MULTI-TRAINING FUNCTION AIR-WATER PUNCHING BAG STRUCTURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an air-water punching bag structure, in particularly, a bag structure which weight and firmness can be adjusted and which has multi-training functions.

Description of Related Arts

Conventional punching bag for combat training is a closed bladder using solid (such as sand), liquid (such as water), or gas (such as air) as filler and is placed inside of an external bag.

It is easy and cheap to obtain the fillers, but the ideal weight of a punching bag, which may impact the training effect, is about half of its user's weight. Also, when solid is used as filler in inner bladder, the weight of the punching bag becomes too heavy to be easily moved or stored. When liquid is solely used as the filler of the inner bladder, the heavy weight of punching bag will result in poor training effect. When gas is used as filler of the inner bladder, the punching bag is usually too light and requires other material to fix it in place. Thus, all of the above can result in poor training effect.

In addition, for conventional punching bag structure which adopts solid, liquid, or gas as filler, there is only one tactile feel. When filling with solids, punching bag gives a firm texture while liquids add a little softness and resilience. When filling with gas, punching bag is even more resilient. However, none of the foregoing fillers can be adjusted in the same structure to create different texture to satisfy different training techniques and users.

In addition, the conventional punching bag structure cannot integrate different training functions simultaneously (such as croissant move training, push-up training, sit-up training, Judo training, boxing training, upper cut training, tackle training, suppression training, and weight training). More training equipments need to be purchased in order to provide different training functions when using punching bag for different technique training, which further increases the training cost. Thus, the drawbacks of conventional punching bag need to be improved.

SUMMARY OF THE PRESENT INVENTION

To overcome the existing problems of prior art, the present invention provides an air-water punching bag structure that uses liquids or colloid as the major weight source for the inner bladder structure and fills up the extra space with air. The external bag structure can integrate suspenders or handles to lower training cost and the weight and softness-hardness can be adjusted to meet the user's demand with different training functions for obtaining the training effect.

The present invention discloses an air-water punching bag structure that comprises an inner bladder, an external bag, at least one set of handles, at least two sets of first suspenders, and at least one set of second suspenders.

The inner bladder is a hollow bladder that further comprises one gas container and one liquid container. The gas container is a bladder for containing gas and is housed in the inner layer of the inner bladder. The gas container even comprises at least one air valve. The air valve is located on one side of the gas container and can be connected to the interior of the gas container to adjust the pressure and volume of the gas container and adjust the location of the liquid and colloid inside the liquid container. Therefore, the weight of the inner bladder can be adjusted to satisfy user's demand and accomplish better combat training effect. The liquid container is a bladder for containing liquid or colloid and is housed in the outer layer of the gas container. The liquid container even comprises at least one water inlet set and one air valve. The water inlet set is located on top of the liquid container and can be connected to the interior of the liquid container to adjust the weight of the liquid or colloid of the liquid container. The air valve of the liquid container is located on top of the liquid container or on top of the water inlet set and can be connected to the inside of the liquid container to adjust the hardness of the inner bladder through inflating or exhausting with the air valve of the liquid container, and thus to obtain the function of adjusting punching texture.

The external bag covers the outer layer of the inner bladder and further comprises a body, protection cover, plural hidden suspenders, and at least two connection straps. The body is a hollow bag that has a first connecting part. The connecting part is located at the edge of the opening of the body. An end of the protection cover can be connected to the body and the side protection edge can be folded inside out to cover the opening and the first connecting part of the body and even comprises plural lacing holes and one second connecting part. The lacing holes are located on the circular surface of the protection cover. The second connecting part is located at the edge of bottom of the protection cover and can be connected to the first connecting part of the body. One end of the hidden suspenders is fixed at the inner layer of the opening of the body and the other end can go through the corresponding lacing holes of the protection cover or can be fixed at the bottom of the protection cover. Each of the connection strap is respectively located on each side of the body with a connecting part. The connecting part is located at the connecting area, but not fixed on the body, while the other areas of the connecting strap are fixed on the body.

The handle set is removable and has multiple handles at different locations and a connecting part. The connecting part is located on one end of the handle set and can be fixed on the connecting part of the connecting strap. The first suspender set is removable and one end of each the first suspender set can go through the connecting part of each the connecting strap and between the external bag of the body. The second suspender set is removable and one end can be fixed on the out layer of the body of the external bag.

Preferably, the air valve of the gas container and the air valve of the liquid container are those for inflating balls or air beds.

Preferably, the external bag comprises one waterproof layer housed between the body of the external bag and the inner bladder. The opening of the waterproof layer can open and close.

Preferably, the second suspender set can adjust its length.

DETAILED DESCRIPTION OF THE PREFERRED EMBODIMENT

The presently preferred embodiment and related aspects of the invention will now be described with reference to the accompanied drawings.

Figure 1:
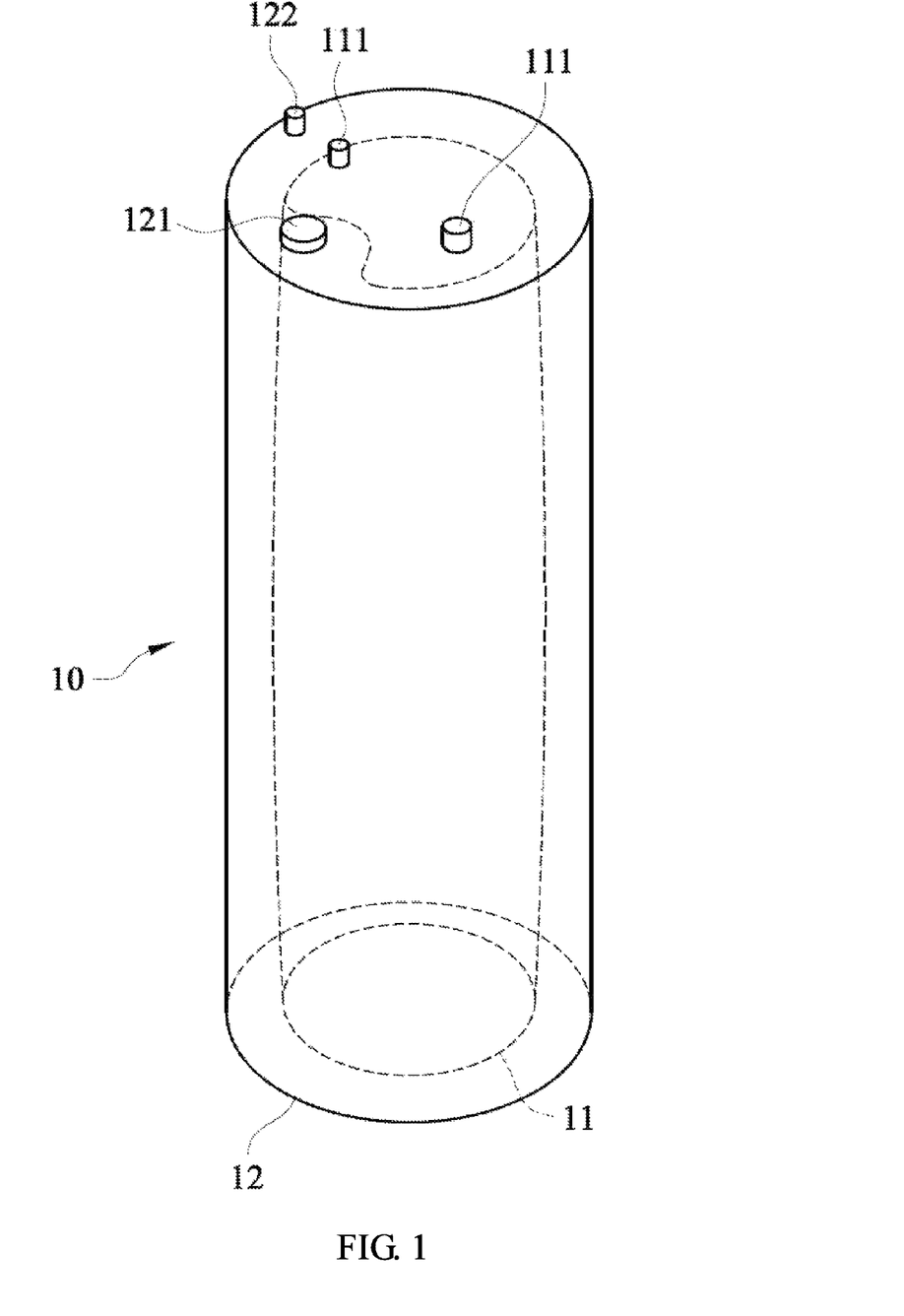
FIG. 1 is a three-dimensional view of the inner bladder of a first preferred embodiment of present invention.
Figure 2:
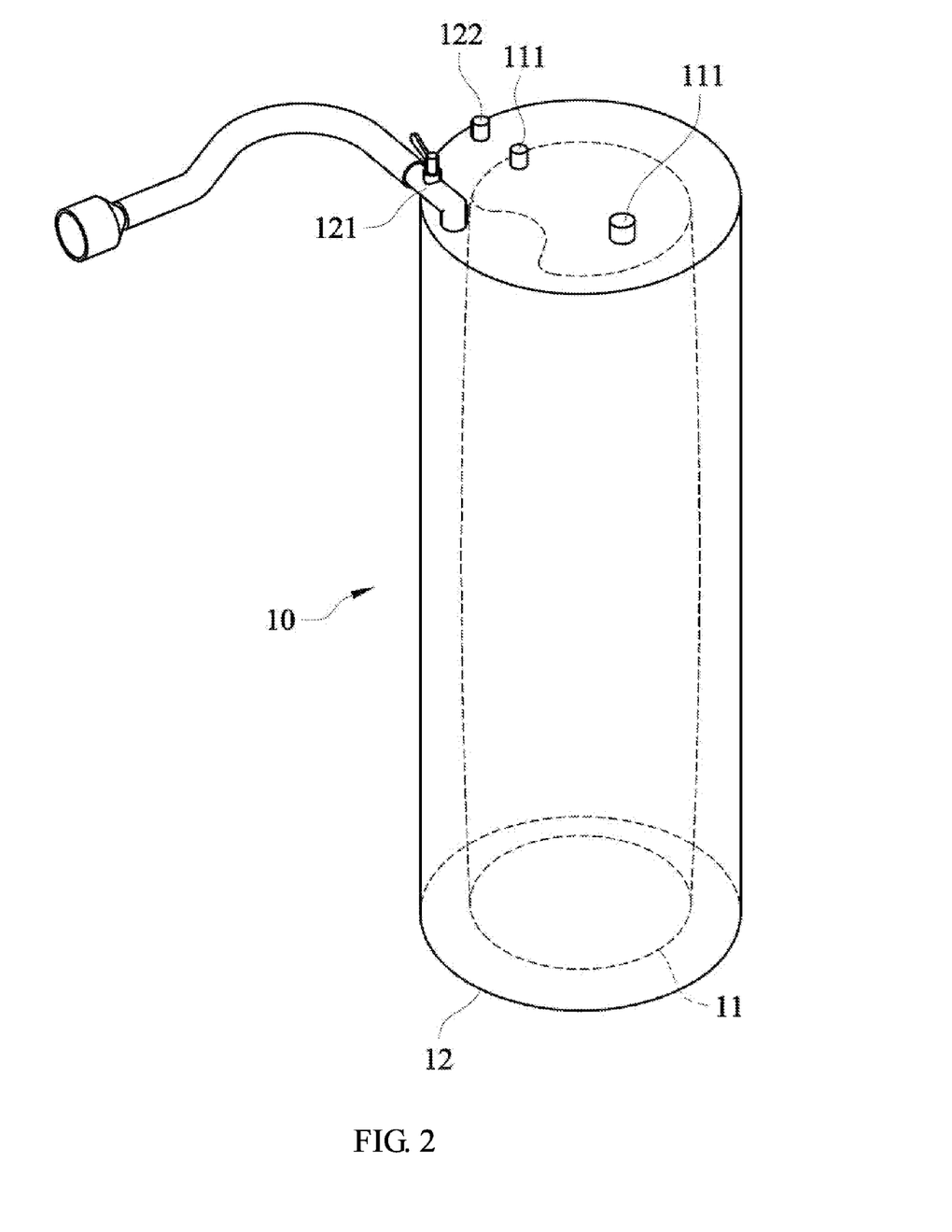
FIG. 2 is another use of three-dimensional view of the inner bladder of the above first preferred embodiment of present invention.

Please refer to FIGS. 1 and 2 for the different three-dimensional views of the inner bladder of preferred embodiment of present invention. Please refer to FIGS. 3 and 4 for the three-dimensional view of the external bog of the first preferred embodiment of present invention and the three-dimensional view of the integration of external bag and inner bladder, respectively. Please refer to FIGS. 5, 6, 7, 8, and 9 for the three-dimensional views of different embodiments of the present invention. The present invention is a multi-training function air-water punching bag structure; wherein the structure comprises one inner bladder 10, one external bag 20, at least one set of handles 30, at least two sets of first suspenders 40, and at least one set of second suspender 50.

The inner bladder 10 is a hollow bladder that further comprises one gas container 11 and one liquid container 12, as shown in FIG. 1. The gas container 11 is a bladder for holding gas and is located in the inner layer of the inner bladder 10. The gas container 11 further comprises at least one air valve 111, which is located at one end of the gas container and can be connected to the interior of the gas container. The liquid container 12 is a bladder for holding liquid or colloid and is located in the outer layer of the gas container 11. The liquid container 12 further comprises at least one water inlet set 121 and at least one air valve 122. The water inlet set 121 is located on top of the liquid container 12 (as shown in FIGS. 1 and 2) and can be connected to the interior of the liquid container 12. The air valve 122 is located on top of the liquid container 12 and can be connected to the interior of the liquid container 12.

Figure 3:
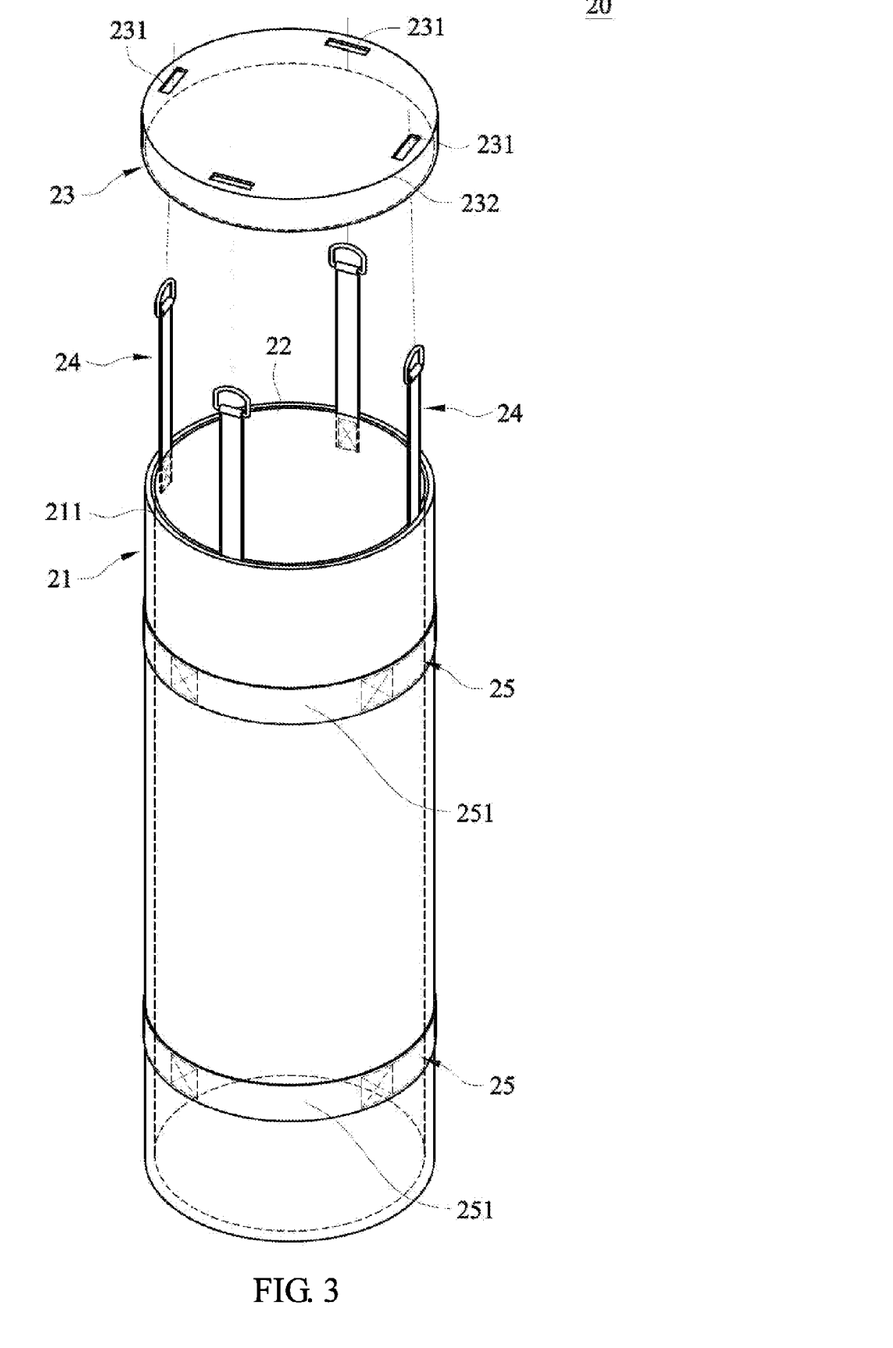
FIG. 3 is a three-dimensional view of the external bag of the above first preferred embodiment of present invention.

As shown in FIG. 3, the external bag 20 covers the outer layer of the inner bladder 10 and further comprises one body 21, one water proof layer 22, one protection cover 23, plural hidden suspenders 24, and at least two connection straps 25. The body 21 is a hollow bag that has one first connecting part 211 and the connecting part 211 is located at the edge of the opening of the body 21. The waterproof layer 22 is located between the external bag 20 body 21 and the inner bladder 10. One end of the protection cover 23 can be folded inside out to cover the opening of the body 21 and even comprises plural lacing holes 231 and one second connecting part 232. The lacing holes 231 are located on the circular surface of the protection cover 23. The second connecting part 232 is located at the edge of bottom of the protection cover 23 and can be connected to the first connecting part 211 of the body 21. One end of the hidden suspenders 24 is fixed at the inner layer of the opening of the body 21 and the other end can go through the corresponding lacing holes 231 of the protection cover 23 or can be fixed at the bottom of the protection cover 23. Each of the connection straps 25 is respectively located on each side of the body 21 with one connecting part 251. The connecting part 251 is located in one area of the connecting strap 25, but not fixed on the body 21, while the other areas of the connecting strap 25 are fixed on the body 21.

The handle set 30 is removable and has multiple handles at different locations and one connecting part 31. The connecting part 31 is located on one end of the handle set 30 and can be fixed on the connecting part 251 of the connecting strap 25. The first suspender set 40 is removable and one end of each the first suspender set 40 can go through the connecting part 251 of each the connecting strap 25 and between the external bag 20 body 21. The second suspender set 50 is removable and the length thereof is adjustable and one end thereof can be fixed on the out layer of the external bag 20 body 21.

First, the inner bladder 10 was put into the external bag 20 and the inner bladder 10 of the gas container 11 was injected with air via the air valve 111 on the gas container 11. The volume of the gas container 11 will increase due to the pressure increase inside the gas container 11 and then the volume of the inner bladder 10 of the liquid container 12 will be reduced.

Then the water inlet set 121 on the liquid container 12 is opened to allow the user to add certain amount of liquid or colloid into the inner bladder 10 of the liquid container 12 via the water inlet set 121 on the liquid container 12. Meanwhile, the top of liquid or colloid inside the inner bladder 10 of the liquid container 12 is filled with air.

Finally the water inlet set 121 on the liquid container 12 is closed and the air valve 122 on the liquid container 12 is opened for injecting air into the inner bladder 10 of the gas container 11 via the air valve 111 of the gas container 11. The volume increases due to the pressure increases inside the inner bladder 10 of the gas container 11 and thus decreases the volume of the inner bladder 10 of the liquid container 12. Meanwhile, the level of liquid or colloid inside the inner bladder 10 of the liquid container 12 will rise due to compression and the air inside the inner bladder 10 of the liquid container 12 will be exhausted via the air valve 122 until the liquid or colloid inside the inner bladder 10 of the liquid container 12 is drained via air valve 122, meaning the air inside the inner bladder 10 of the liquid container 12 is completely exhausted. Meanwhile, the air injection into gas container 11 via the air valve 111 of the gas container 12 is stopped and the air valve 122 of the liquid container 12 is closed to completely seal the inner bladder 10 of the liquid container 12.

The inner bladder 10 of the liquid container 12 is completely filled with demanded amount of liquid or colloid in accordance with user's training need to obtain desired texture of punching at practice and change the texture of punching via changing the pressure of the gas container 11, and thus result in better training effect. The liquid or colloid and air inside the inner bladder 10 all can be respectively exhausted via the water inlet set 121 on the liquid container 12 and the air valve 111 on the gas container 11, thus the air-water punching bag structure is easier to be stored and moved.

If the firmness of the air-water punching bag structure is desired to be increased, air can be injected into the inner bladder 10 of the liquid container 12 via the air valve 122 on the liquid container 12.

In addition, if the liquid of colloid inside the liquid container 12 is not filled all the way up, the liquid or colloid inside the liquid container 12 will jiggle when the air-water punching bag structure is punched with external force; therefore, the center of the air-water punching bag structure will be shifting. A user will have to additionally use his/her muscles in different parts of the body to obtain balance, and thus further train more small groups of muscles.

Figure 4:
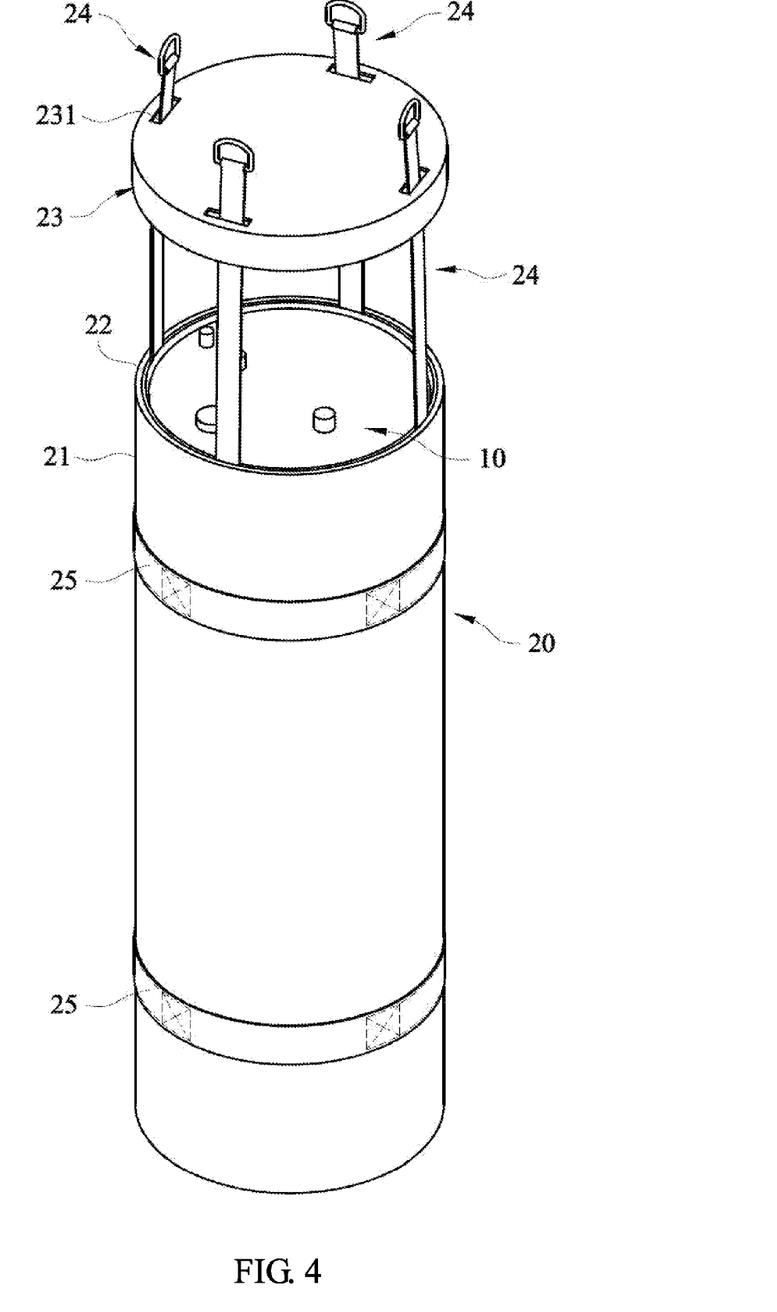
FIG. 4 is a three-dimensional view of the integration of external bag and inner bladder of the above first preferred embodiment of the present invention.
Figure 5:
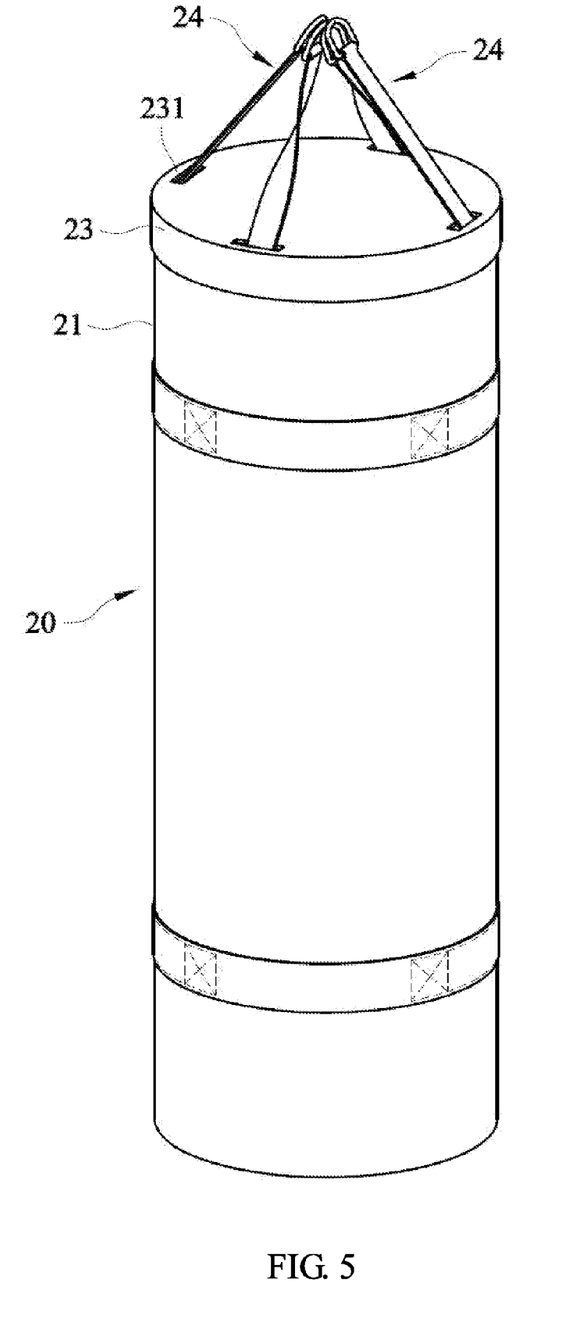
FIG. 5 is a three-dimensional view of a second preferred embodiment of present invention.

As shown in FIGS. 4 and 5, the side of the protection cover 23 of the external bag 20 is folded up, so one end of the hidden suspenders 24 of the external bag 20 goes through the corresponding lacing holes 231 on the protection cover 23 and the second connecting part 232 on the protection cover 23 integrates the first connecting part 211 of the body 21. Further the side of the protection cover 23 of the external bag 20 can be folded down to cover the opening of the body 21. Then the other end of each hidden suspender 24 of the external bag 20 is hung on the boxing suspending device (not shown in the drawings), so as to be used as boxing training sandbag.

Figure 6:
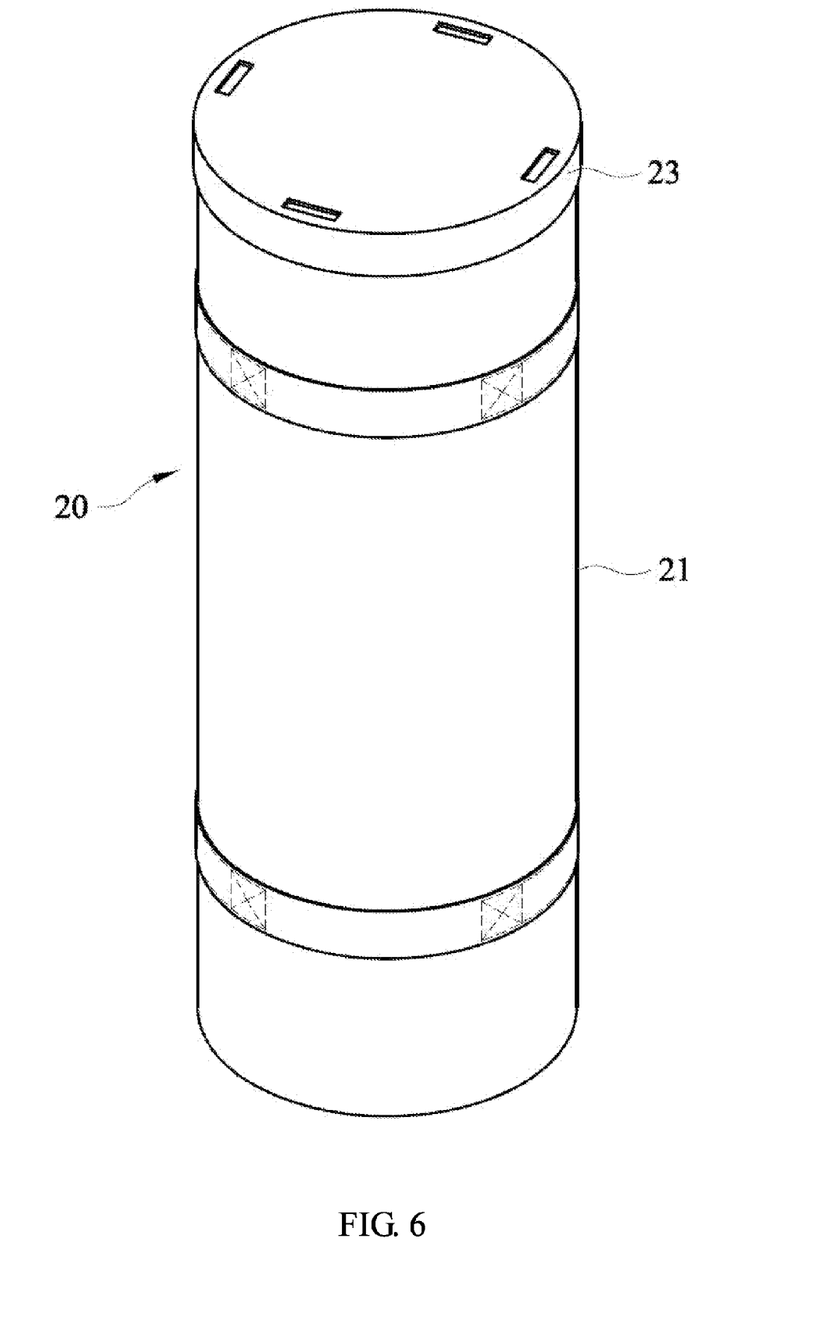
FIG. 6 is a three-dimensional view of a third preferred embodiment of present invention.

As shown in FIG. 6, the side of the protection cover 23 of the external bag 20 is folded up and one end of the hidden suspenders 24 of the external bag 20 is fixed on the bottom of the protection cover 23 and the second connecting part 232 on the protection cover 23 integrates the first connecting part 211 of the body 21. Further the side of the protection cover 23 of the external bag 20 is folded down to cover the opening of the body 21. If the air-water punching bag structure is vertical, it can produce different throwing, tossing, and tackling training effects when the center shifts. If the air-water punching bag structure is horizontal and is used as the force pivot point, it can produce different push-up and sit-up training effects when the center shifts.

Figure 7:
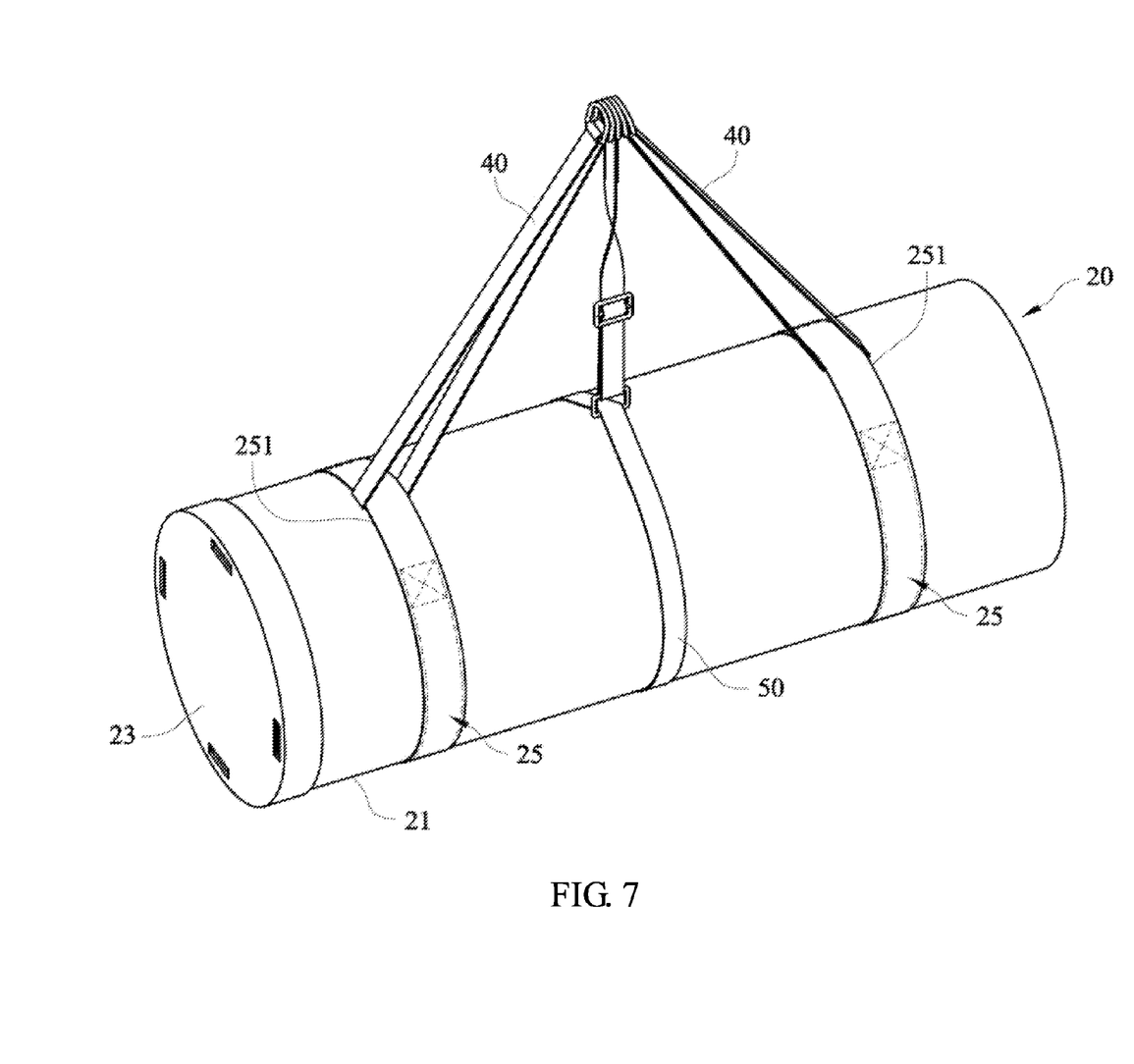
FIG. 7 is a three-dimensional view of a forth preferred embodiment of present invention.

As shown in FIG. 7, the side of the protection cover 23 of the external bag 20 is folded up and one end of the hidden suspenders 24 of the external bag 20 is fixed on the bottom of the protection cover 23 and the second connecting part 232 on the protection cover 23 integrates the first connecting part 211 of the body 21. Further the side of the protection cover 23 of the external bag 20 is folded down to cover the opening of the body 21. One end of each of the first set of suspenders 40 goes through the connecting strap 25 of the connecting part 251 between the external bag 25 and the body 21. The second set of suspenders 50 is housed in the outer layer of the external bag 20 and the body 21. The length of the other end of the second set of suspenders 50 can be adjusted to make the external bag 20 not to be distorted easily while taking external force. Then each end of the each first set of suspenders and the second set of suspenders are hung on the boxing suspending device (not shown in the drawings) to create the sandbag training effect of upper cut.

Figure 8:
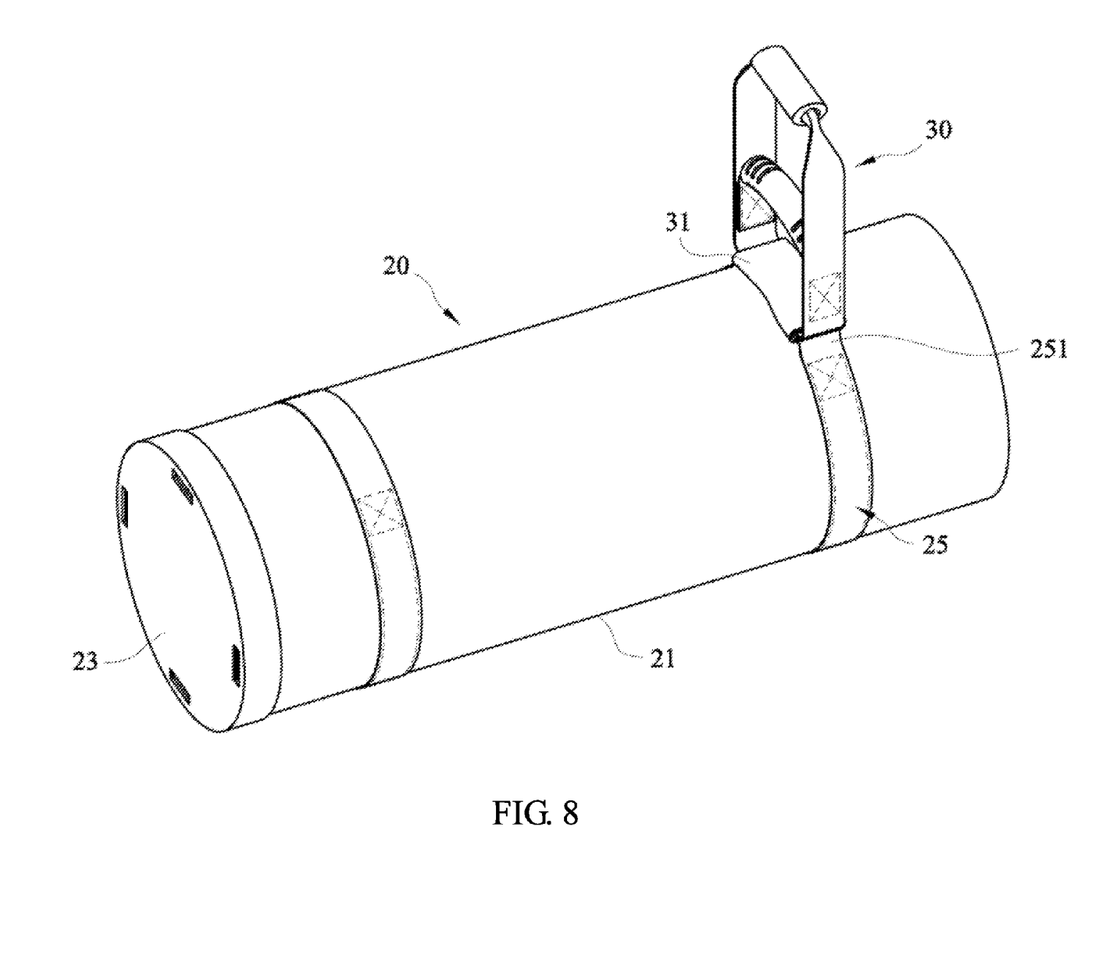
FIG. 8 is a three-dimensional view of a fifth preferred embodiment of present invention.

As shown in FIG. 8, the side of the protection cover 23 of the external bag 20 is folded up and one end of the hidden suspenders 24 of the external bag 20 is fixed on the bottom of the protection cover 23 and the second connecting part 232 on the protection cover 23 integrates the first connecting part 211 of the body 21. Further, the side of the protection cover 23 of the external bag 20 is folded down to cover the opening of the body 21. The connecting part 31 of the handle set 30 is fixed on top of the connecting part 251 on one side of the connecting strap 25 of the external bag 20. If a user conducts suppression training on the air-water punching bag structure, the air-water punching bag structure can produce jiggles; meanwhile, trainer holds the handle set 30 to pull and swing to simulate the struggling of a real person to achieve different suppression training effects. If both hands of the user respectively hold on different spots of the handle set 30 to conduct Judo suplex moves training, he can achieve different Judo suplex training effects when the center shifts.

Figure 9:
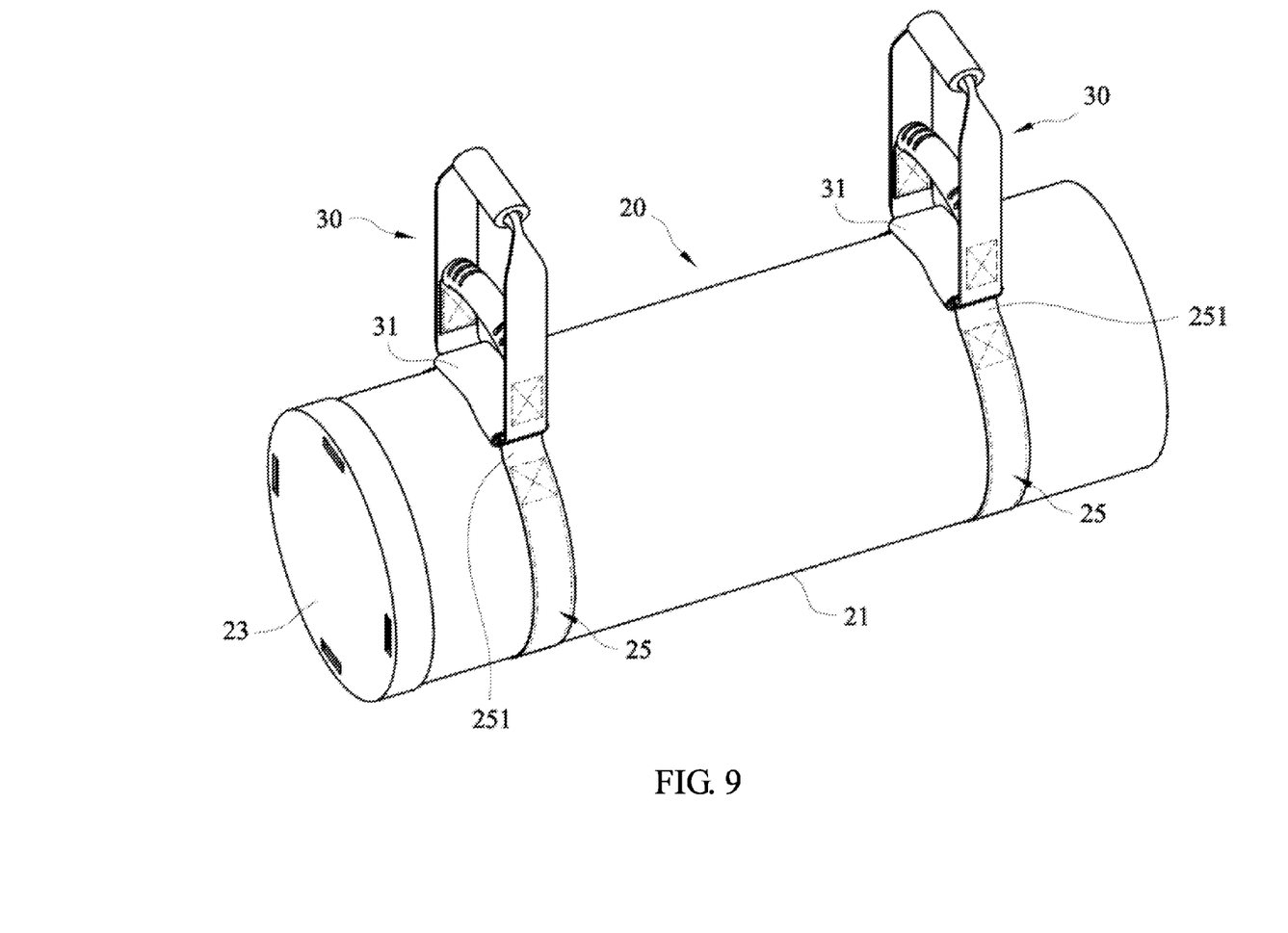
FIG. 9 is a three-dimensional view of a sixth preferred embodiment of present invention.

As shown in FIG. 9, the side of the protection cover 23 of the external bag 20 is folded up and one end of the hidden suspenders 24 of the external bag 20 is fixed on the bottom of the protection cover 23 and the second connecting part 232 on the protection cover 23 integrates the first connecting part 211 of the body 21. Further, the side of the protection cover 23 of the external bag 20 is folded down to cover the opening of the body 21. The connecting part 31 of each the handle set 30 is fixed on the top of the connecting part 251 of each the connecting strap 25. Both hands of the user can respectively hold on each the handle set 30 to produce different croissant moves, arm weight, and leg weight training effects when the center shifts.

What is claimed is:

1. A multi-training function air-water punching bag structure, comprising:
    an inner bladder, which is a hollow bladder, comprising:
        a gas container for gas storage located in an inner compartment of said inner bladder and comprising at least one air valve located on an end of said gas container and connected to an interior of said gas container, and
        a liquid container for liquid or colloid storage located in an outer compartment of said inner bladder, comprising at least one water inlet set, which is located on top of said liquid container and connected to an interior of said liquid container, and at least one air valve, which is located on top of said liquid container or on said at least one water inlet set for being connected to said interior of said liquid container;
    an external bag, which covers an outer layer of said inner bladder, comprising:
        a body which is a hollow bag having a first connecting part located at an edge of an opening of said body,
        a protection cover having a foldable side for covering said opening and said first connecting part of said body, having plural lacing holes located on a circular surface of said protection cover and a second connecting part located at an edge of a bottom of said protection cover for being connected to said first connecting part of said body,
        plural hidden suspender sets having a first end thereof fixed in an interior of the opening of the body and a second end thereof passed through the plural lacing holes of said protection cover or being fixed on said bottom of said protection cover, and
        at least two connecting straps respectively located on sides of said body and each having a strap connecting part located in an area thereof without being fixed on said body while other areas of said connecting straps are fixed on said body; and
    at least one handle set which is removable and has a handle connecting part for being used at different positions, wherein said handle connecting part is located on an end of said at least one handle set for being fixed on said strap connecting part.

2. The air-water punching bag structure as recited in claim 1, wherein said plural suspender sets comprise at least two first suspender sets and at least one second suspender set, wherein said first suspender sets are removable and an end of each said first and second suspender sets is configured for going through between said connecting part of said connecting straps and said external bag of said body, wherein said at least one second suspender set is removable and an end thereof is configured for being fixed on an outer layer of said external bag of said body.

3. The air-water punching bag structure as recited in claim 2, further comprising a waterproof layer located between said external bag of said body and said inner bladder.

4. The air-water punching bag structure as recited in claim 3, wherein an opening of said waterproof layer is closable.

5. The air-water punching bag structure as recited in claim 4, wherein a length of said second suspender set is adjustable.

6. The air-water punching bag structure as recited in claim 3, wherein a length of said second suspender set is adjustable.

7. The air-water punching bag structure as recited in claim 2, wherein a length of said second suspender set is adjustable.

8. The air-water punching bag structure as recited in claim 1, further comprising a waterproof layer located between said external bag of said body and said inner bladder.

9. The air-water punching bag structure as recited in claim 8, wherein an opening of said waterproof layer is closable.

10. The air-water punching bag structure as recited in claim 9, wherein a length of said second suspender set is adjustable.

11. The air-water punching bag structure as recited in claim 8, wherein a length of said second suspender set is adjustable.

* * * * *